(12) United States Patent
Wu

(10) Patent No.: US 9,853,525 B2
(45) Date of Patent: Dec. 26, 2017

(54) MAGNETIC BEARING ASSEMBLY AND ARRANGEMENT OF POSITION SENSORS FOR A MAGNETIC BEARING ASSEMBLY

(71) Applicant: ABB Research Ltd., Zurich (CH)

(72) Inventor: Dezheng Wu, Shanghai (CN)

(73) Assignee: ABB Research Ltd., Zurich (CH)

( * ) Notice: Subject to any disclaimer, the term of this patent is extended or adjusted under 35 U.S.C. 154(b) by 825 days.

(21) Appl. No.: 13/789,515

(22) Filed: Mar. 7, 2013

(65) Prior Publication Data

US 2013/0328455 A1   Dec. 12, 2013

Related U.S. Application Data

(60) Provisional application No. 61/658,895, filed on Jun. 12, 2012.

(51) Int. Cl.
*H02K 7/09* (2006.01)
*H02K 11/00* (2016.01)
(Continued)

(52) U.S. Cl.
CPC ...... *H02K 11/0015* (2013.01); *F16C 32/0446* (2013.01); *F16C 32/0476* (2013.01);
(Continued)

(58) Field of Classification Search
CPC ...... H02K 7/09; H02K 11/0015; H02K 11/21; F16C 32/0446; F16C 32/0476
(Continued)

(56) References Cited

U.S. PATENT DOCUMENTS

| 4,353,602 A | 10/1982 | Habermann |
| 5,153,475 A | 10/1992 | McSparran |

(Continued)

FOREIGN PATENT DOCUMENTS

| EP | 0 362 882 B1 | 1/1994 |
| EP | 0 961 044 A2 | 12/1999 |

(Continued)

OTHER PUBLICATIONS

"Magnetic bearing," http://en.wikipedia.org/wiki/Magnetic_bearing, pp. 1-6 (Mar. 31, 2012) (Dowloaded from the Internet May 3, 2012).

(Continued)

*Primary Examiner* — John K Kim
(74) *Attorney, Agent, or Firm* — Taft Stettinius & Hollister LLP

(57) ABSTRACT

The subject matter described herein includes a magnetic bearing assembly and an arrangement of position sensors for the magnetic bearing assembly. In one example the magnetic bearing assembly includes a rotor for fixedly coupling to a shaft for rotating with the shaft. The assembly further includes at least one stator assembly located adjacent to the rotor and circumferentially surrounding the shaft. The stator assembly includes a control coil for magnetically supporting the rotor. The stator assembly further includes a plurality of position sensors that are circumferentially spaced from each other and that extend radially from the stator assembly for measuring an indication of axial displacement of the rotor.

11 Claims, 4 Drawing Sheets

(51) Int. Cl.
*F16C 32/04* (2006.01)
*H02K 11/21* (2016.01)

(52) U.S. Cl.
CPC ............... *H02K 7/09* (2013.01); *H02K 11/21* (2016.01); *F16C 2300/02* (2013.01)

(58) Field of Classification Search
USPC .............................................. 310/68 B, 90.5
IPC ............................................... H02K 7/09,11/00
See application file for complete search history.

(56) References Cited

U.S. PATENT DOCUMENTS

| | | | |
|---|---|---|---|
| 5,216,308 A | 6/1993 | Meeks | |
| 6,268,674 B1 | 7/2001 | Takahashi | |
| 6,355,998 B1* | 3/2002 | Schob | H02K 7/09 310/68 B |
| 6,603,230 B1* | 8/2003 | Abel | F16C 32/0444 310/74 |
| 6,737,861 B2 | 5/2004 | Lantto | |
| 7,023,118 B1* | 4/2006 | Morrison | F16C 32/0442 310/74 |
| 7,078,839 B2* | 7/2006 | Kim | F16C 32/0493 310/168 |
| 7,112,903 B1* | 9/2006 | Schob | F16C 32/0465 310/90.5 |
| 7,429,811 B2* | 9/2008 | Palazzolo | F16C 32/0442 310/90.5 |
| 7,557,480 B2* | 7/2009 | Filatov | F16C 32/0465 310/68 B |
| 8,058,758 B2* | 11/2011 | Ries | F16C 32/041 310/68 B |
| 2002/0036435 A1* | 3/2002 | Ooyama | F16C 32/0446 310/90.5 |
| 2008/0054741 A1* | 3/2008 | Oyama | F16C 32/0444 310/68 A |
| 2009/0121571 A1* | 5/2009 | Onuma | F04D 29/058 310/90.5 |
| 2009/0265038 A1 | 10/2009 | Ramsey et al. | |
| 2013/0328455 A1* | 12/2013 | Wu | F16C 32/0446 310/68 B |

FOREIGN PATENT DOCUMENTS

| | | |
|---|---|---|
| EP | 1 517 042 A1 | 3/2005 |
| JP | 63145818 | 6/1988 |
| JP | 01255715 | 10/1989 |
| JP | 09196064 A | 7/1997 |
| JP | 2007278381 | 10/2007 |
| WO | WO 2006/074560 A2 | 7/2006 |

OTHER PUBLICATIONS

International Search Report and the Written Opinion of the International Searching Authority for International Application No. PCT/EP2013/054702 dated Jun. 13, 2013.

* cited by examiner

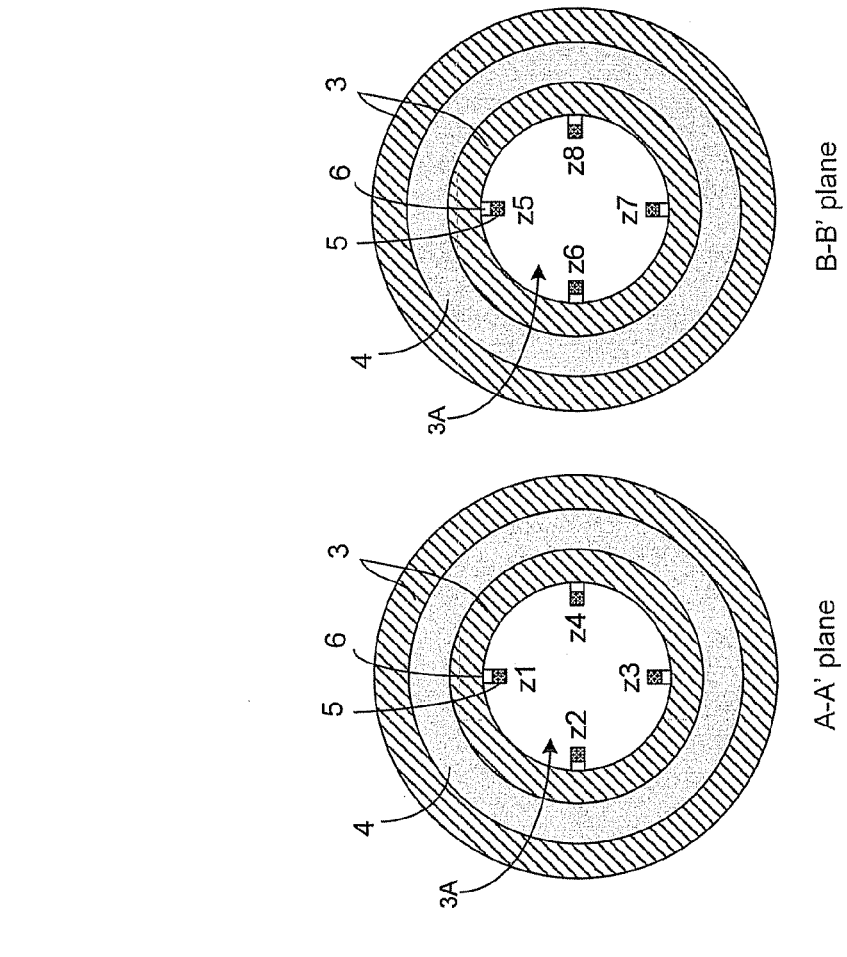
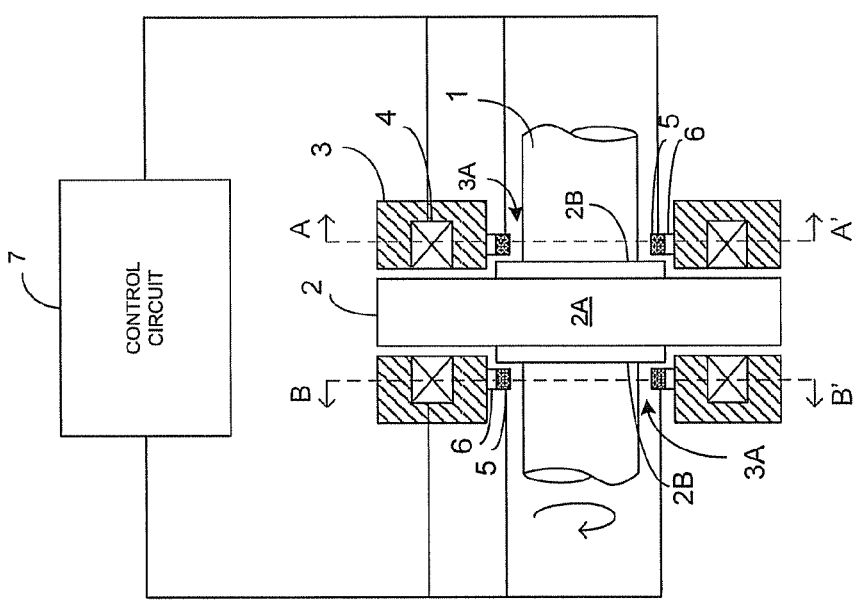
FIG. 1A
FIG. 1B
FIG. 1C

A-A' plane

B-B' plane

MAGNETIC BEARING ASSEMBLY AND ARRANGEMENT OF POSITION SENSORS FOR A MAGNETIC BEARING ASSEMBLY

RELATED APPLICATIONS

The presently disclosed subject matter claims the benefit of U.S. Provisional Patent Application Ser. No. 61/658,895, filed Jun. 12, 2012; the disclosure of which is incorporated herein by reference in its entirety.

TECHNICAL FIELD

The subject matter described herein relates to magnetic bearing assemblies. More particularly, the subject matter described herein relates to a magnetic bearing assembly and an arrangement of position sensors for a magnetic bearing assembly.

BACKGROUND

Magnetic bearings are often used in high speed rotating machinery to support a shaft or rotor using electromagnetic force to levitate or support the rotor without physical contact. A typical magnetic bearing assembly includes a shaft, a rotor that rotates with the shaft, a stator that remains stationary, and control coils for controlling the axial and radial displacement of the rotor. Position sensors are used to sense the axial and radial displacement of the rotor. A controller uses the output from the position sensors to vary the current in the control coils to adjust the axial and radial displacement of the rotor and the shaft to which the rotor is attached.

Prior magnetic bearing assemblies have located the position sensors adjacent to the control coils, which can result in electromagnetic and thermal interference between the control coils and the measurement coils used in the position sensors. Other approaches include locating a part of the position measuring apparatus in the shaft, which increases the size of the magnetic bearing assembly. Prior designs can also require separate position sensors for sensing axial and radial shaft position. Using separate sensors to sense axial and radial position increases the size and complexity of the magnetic bearing assembly.

Accordingly, in light of these difficulties, there exists a need for a magnetic bearing assembly with position sensors that are located separately from the control coils and that are efficiently positioned to reduce the size of the magnetic bearing assembly.

SUMMARY

The subject matter described herein includes a magnetic bearing assembly and an arrangement of position sensors for the magnetic bearing assembly. In one example, the magnetic bearing assembly includes a rotor for fixedly coupling to a shaft for rotating with the shaft. The assembly further includes at least one stator assembly located adjacent to the rotor and for circumferentially surrounding the shaft. The stator assembly includes a control coil for magnetically supporting the rotor. The stator assembly further includes a plurality of position sensors that are circumferentially spaced from each other and that extend radially from the stator assembly for measuring an indication of axial displacement of the rotor.

BRIEF DESCRIPTION OF THE DRAWINGS

Preferred embodiments of the drawings will now be described of which:

FIG. 1A is a cross-sectional side view and FIGS. 1B and 1C are cross-section views of a magnetic bearing assembly according to an embodiment of the subject matter described herein;

DETAILED DESCRIPTION

Figure 2A:
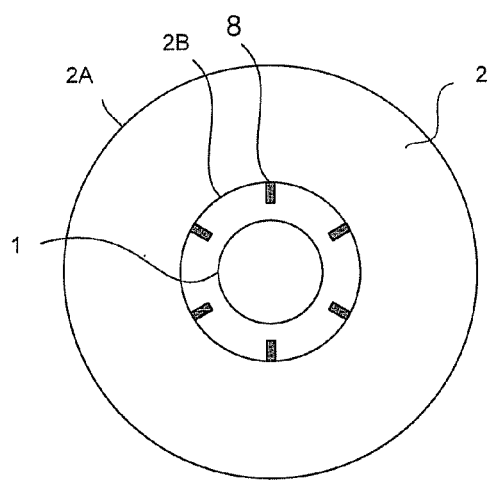
FIG. 2A is a front view and FIG. 2B is a perspective view of the shaft and rotor shown in FIGS. 1A, 1B and 1C, illustrating rotor structures for measuring rotational speed, acceleration and/or angular position according to an embodiment of the subject matter described herein.

The subject matter described includes a magnetic bearing assembly and arrangement of position sensors for a magnetic bearing assembly. FIG. 1A is a sectional side view of a magnetic bearing assembly with an arrangement of position sensors according to an embodiment of the subject matter described herein. Referring to FIG. 1A, a magnetic bearing assembly circumferentially surrounds a shaft 1 to control radial and axial position of shaft 1. The assembly includes a rotor 2 that is configured to be fixedly attached to shaft 1 for rotating with shaft 1. In the illustrated example, rotor 2 includes a primary rotor disk 2A and secondary rotor disks 2B located on opposite-facing surfaces of primary rotor disk 2A and that are radially smaller than primary rotor disk 2A.

The assembly illustrated in FIG. 1A further includes stator assemblies 3 located on opposite sides of rotor 2. Each stator assembly 3 includes a control coil 4 and a plurality of position sensors 5. As illustrated in FIG. 1A, the secondary rotor disks 2B may have a smaller diameter than the diameter of the inner bore or aperture 3A of each stator assembly 3 and may extend into the inner bore or aperture 3A of the corresponding stator assembly 3.

Each position sensor 5 extends radially inward from an inner surface of each stator assembly 3 into the inner bore or aperture 3A of each stator assembly 3 towards shaft 1. Each position sensor 5 is mounted on a non-metallic connector 6. Each position sensor 5 may be a magnetic sensor that senses the displacement of a magnetic element in the proximity of each sensor 5. For example, each position sensor 5 may include a magnetic coil that senses a change in magnetic field caused by axial or radial movement of rotor 2 or of indicia, such as notches, formed in the surface of rotor 2. A control circuit 7 detects the output signals from sensors 5 and uses the signals to vary the current in control coils 4 to adjust the axial and/or radial displacement of rotor 2 and shaft 1. To reduce, minimize or prevent crosstalk between the position sensor 5 and the control coil 4, the excitation frequency for the magnetic coil of the position sensor 5 may be higher than the excitation frequency for the control coil 4.

As used herein, the term "axial displacement" refers to displacement in the same direction as the axis of shaft 1. The terms "radial displacement," "horizontal displacement," and "vertical displacement" refer to displacement in a direction orthogonal to and outward from the axis of shaft 1. As used herein, the terms "horizontal" and "vertical" refer to the relative directions or orientations described and/or illustrated with regard to certain radial displacements within the embodiments described herein, and should not be understood to require any particular orientation of the magnetic bearing assembly or shaft 1. The terms "angular displacement" and "angular position" refer to displacement or position in the direction of rotation of shaft 1.

In FIGS. 1B and 1C, it can be seen that position sensors 5 extend radially inward from their respective stator assemblies 3. In one example, each stator assembly 3 includes four position sensors that are equally circumferentially spaced from each other by an angle of 90 degrees.

Figure 2B:
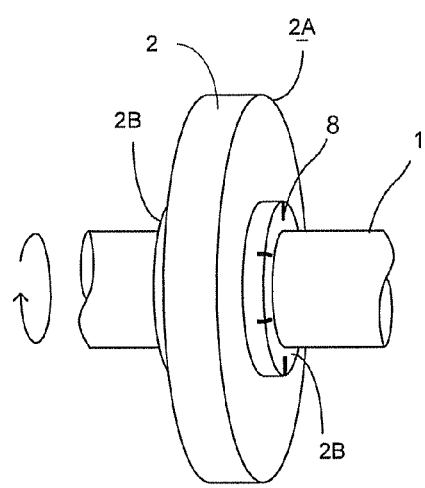

As illustrated in FIGS. 2A and 2B, secondary rotor disks 2B may each include position indicia 8, such as notches or bumps, that control circuit 7 (illustrated in FIG. 1A) uses in conjunction with position sensors 5 (illustrated in FIG. 1A) to measure axial, radial and/or angular displacement of the rotor. Control circuit 7 may measure the rate at which indicia 8 pass sensors 5 to determine angular position, velocity, and/or acceleration. When one of indicia 8 is aligned with a position sensor 5, the signal level output from the corresponding position sensor is different from when the notch is not aligned with the sensor. The difference in signal level is caused by the change in magnetic flux when a position sensor and notch are aligned versus when the position sensor and notch are not aligned. By counting the number of output signal pulses received from the sensors 5, i.e., the number of times when the signal corresponds to the sensor being adjacent to a notch or indicium, the angular position of shaft 1 can be obtained. The discrete value of angular position can be obtained by multiplying the total number of pulses with the angular interval between two notches. Control circuit 7 may determine the rotational speed and/or acceleration of the shaft 1 by measuring or calculating the rate at which indicia 8 pass sensors 5 based on the frequency of the output signals received from the sensors 5.

In order to measure axial displacement of rotor 2, the position sensors illustrated in FIGS. 1B and 1C may be assumed to produce output signals $z_1$, $z_2$, $z_3$, $z_4$, $z_6$, $z_7$, and $z_5$. Control circuit 7 may determine the axial displacement of rotor 2 using the equation $(z_1+z_2+z_3+z_4-z_5-z_6-z_7-z_8)/4$. Control circuit 7 may determine the vertical displacement of rotor 2 using the equation $(z_1+z_5-z_3-z_7)/2$. Control circuit 7 may determine the horizontal displacement of rotor 2 using the equation $(z_2+z_6-z_4-z_8)/2$. Thus, using the same set of position sensors, both axial and radial (or vertical and horizontal) displacement of the rotor can be obtained.

Control circuit 7 may utilize the output signals received from the sensors 5 and/or the determined displacement values and function as a feedback controller to adjust the axial and radial position of rotor 2. For example, it may be desirable to maintain rotor 2 axially centered between stator assemblies 3. Control circuit 7 may determine from the signals output from position sensors 5 that rotor 2 is closer to one stator assembly than the other and may energize the control coils 4 in the more distant stator assembly 3 to apply magnetic force in the axial direction to rotor 2 and attract rotor 2 axially toward that stator assembly. Similarly, it may be desirable to maintain rotor 2 centered within the inner bore of the stator assemblies. If control circuit 7 determines that shaft is out of center, control circuit 7 may energize the coils in one or both stator assemblies 3 to apply magnetic force to rotor 2 to radially center rotor 2.

Figure 3A:
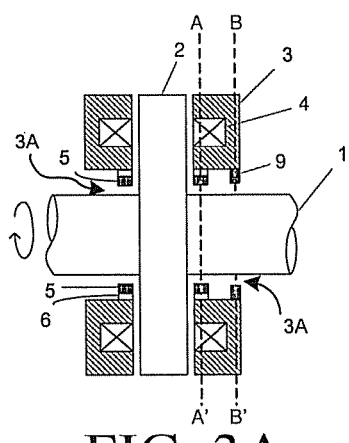
FIG. 3A is a cross-sectional side view and FIGS. 3B and 3C are cross-section views of a magnetic bearing assembly with separate radial and axial position sensors according to an embodiment of the subject matter described herein.
Figure 3B:
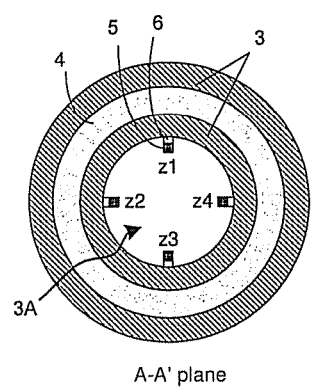
Figure 3C:
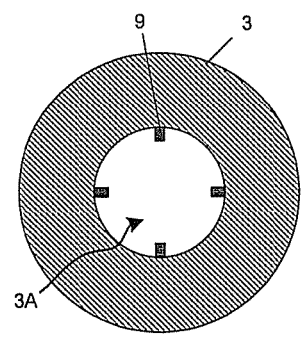

In the examples illustrated in FIGS. 2A and 2B, secondary rotor disks 2B are located on both sides of primary rotor disk 2A. Alternatively, as illustrated in FIGS. 3A, 3B and 3C, secondary rotor disks 2B may be omitted and position indicia, such as notches or bumps, may be located on the surface of primary rotor disk 2A. Also illustrated in FIGS. 3A, 3B, and 3C, separate sets of radial position sensors 9 are included to measure radial shaft position. Radial position sensors 9 are preferably located inside the inner bore 3A of stator assemblies 3. Position sensors 5 are also included, which measure axial shaft position as described above.

Figure 4:
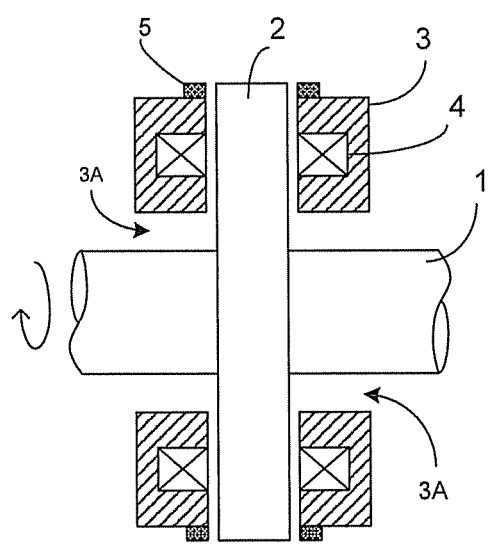
FIG. 4 is a cross-sectional side view of a magnetic bearing assembly with an alternate arrangement of position sensors according to an embodiment of the subject matter described herein.

FIG. 4 illustrates yet another embodiment of the subject matter described herein where position sensors 5 are located on the outer circumference of stator assemblies 3, rather than within the inner bores or apertures 3A of each stator assembly 3. The axial bearing assembly illustrated in FIG. 4 requires a slightly larger rotor disk than the other embodiments described herein but is still operable to measure axial displacement of rotor 2.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A magnetic bearing assembly comprising:
   a rotor for fixedly coupling to a shaft for rotating with the shaft;
   at least one stator assembly located adjacent to the rotor and for circumferentially surrounding the shaft, the stator assembly including a control coil for magnetically supporting the rotor and a plurality of position sensors circumferentially spaced from each other and extending radially from the stator assembly for measuring an indication of axial displacement of the rotor; and
   a control circuit for determining the axial position of the shaft based on output signals from the position sensors;
   wherein the at least one stator assembly comprises first and second stator assemblies located on opposite sides of the rotor, the position sensors include a plurality of position sensors on each stator assembly, the rotor comprises a primary disk and secondary disks located on opposite facing sides of the primary disk, the secondary disks being smaller than the primary disk, the secondary disks each including a plurality of position indicia, and the position sensors are configured to measure angular position of the rotor using the position indicia and the position sensors extend radially outward from an outer circumference of the stator assembly.

2. The magnetic bearing assembly of claim 1 wherein the position sensors in the stator assembly are equally circumferentially spaced from each other.

3. The magnetic bearing assembly of claim 2 wherein the position sensors are spaced at 90 degrees from each other.

4. The stator assembly of claim 1 wherein the position sensors extend radially inward from the stator assembly into a gap between the stator assembly and the shaft.

5. The magnetic bearing assembly of claim 4 wherein the control circuit configured to determine the axial displacement of the shaft and radial displacement of the shaft using signals output by the position sensors.

6. The magnetic bearing assembly of claim 1 wherein the rotor or the shaft includes a plurality of position indicia and wherein the position sensors includes a first set of position sensors for measuring an indication of radial displacement of the shaft and a second set of position sensors axially spaced from the first set of position sensors for measuring the indication of axial displacement of the shaft.

7. A magnetic bearing assembly comprising:
a rotor for fixedly coupling to a shaft for rotating with the shaft; at least one stator assembly located adjacent to the rotor and having a central aperture for receiving the shaft; and
a plurality of position sensors located in the central aperture of the stator and extending radially inward, the position sensors being configured to measure at least one of an indication of axial displacement and an indication of radial displacement of the rotor; and
a control circuit for computing the axial position of the shaft based on output signals from the position sensors;
wherein the at least one stator assembly comprises first and second stator assemblies located on opposite sides of the rotor, wherein the position sensors include four position sensors on each stator assembly that are equally circumferentially spaced from each other, wherein the rotor comprises a primary disk and secondary disks located on opposite facing sides of the primary disk, the secondary disks being smaller than the primary disk, the secondary disks each including a plurality of position indicia, and wherein the position sensors are configured to measure angular position of the rotor using the position indicia.

8. The magnetic bearing assembly of claim 7 wherein the stator assembly includes a control coil for magnetically supporting the rotor, and wherein the position sensors are radially separated from the control coil.

9. The magnetic bearing assembly of claim 7 wherein the position sensors on one side of the rotor disk produce output signals $Z_1$, $Z_2$, $Z_3$, and $Z_1$, wherein the position sensors on the opposite side of the rotor produce output signals $Z_5$, $Z_6$, $Z_7$, and $Z_8$ wherein the control circuit is configured to determine the axial displacement of the rotor using the equation $(Z_1+Z_2+Z_3+Z_4-Z_6-Z_6-Z_7-Z_8)/4$.

10. The magnetic bearing assembly of claim 9 wherein the control circuit is configured to compute the vertical displacement of the rotor using the equation $(Z_1+Z_5-Z_3-Z_7)/2$.

11. The magnetic bearing assembly of claim 9 wherein the position sensors comprise magnetic position sensors.

* * * * *